(12) United States Patent
Shetty et al.

(10) Patent No.: US 11,711,470 B1
(45) Date of Patent: Jul. 25, 2023

(54) DISTRIBUTED PARALLEL QUEUEING FOR CALL MANAGEMENT

(71) Applicant: West Corporation, Omaha, NE (US)

(72) Inventors: Santhosh Shetty, Omaha, NE (US);
Karen Sue White, Omaha, NE (US);
Mark P. O'Brien, Bennington, NE (US);
Sherry Schluchter, Louisville, NE (US);
Meredith Alder, Omaha, NE (US)

(73) Assignee: Intrado Corporation, Omaha, NE (US)

( * ) Notice: Subject to any disclaimer, the term of this patent is extended or adjusted under 35 U.S.C. 154(b) by 0 days.

(21) Appl. No.: 16/156,596

(22) Filed: Oct. 10, 2018

(51) Int. Cl.
*H04M 3/00* (2006.01)
*H04M 5/00* (2006.01)
*H04L 12/66* (2006.01)
*H04M 3/523* (2006.01)
*H04L 67/306* (2022.01)

(52) U.S. Cl.
CPC ................... *H04M 3/523* (2013.01); *H04L 67/306* (2013.01)

(58) Field of Classification Search
CPC ............ H04M 3/5231; H04M 3/5238; H04M 3/5191; H04M 3/5183; H04M 3/5166; H04M 3/5232; H04M 3/5175; H04M 3/5158; H04M 3/42195; H04M 2203/60; H04M 3/5233; H04M 3/523; H04M 3/42059; H04M 3/4211; H04M 2203/2077; H04L 29/06027; H04L 51/04; H04L 67/02; H04L 51/00; H04L 65/4007
USPC ............ 379/265.09, 210.01, 265.02, 265.11, 379/266.01, 265.12, 265.14; 370/352
See application file for complete search history.

(56) References Cited

U.S. PATENT DOCUMENTS

| | | | | |
|---|---|---|---|---|
| 6,345,094 B1* | 2/2002 | Khan et al. | ......... | H04M 3/5158 379/266.07 |
| 6,493,446 B1* | 12/2002 | Cherry | ................... | H04M 3/36 379/265.01 |
| 8,243,719 B1* | 8/2012 | Fillinger et al. | ..... | H04M 3/5231 370/352 |
| 2003/0068029 A1* | 4/2003 | McFarland | ........... | H04M 3/465 379/202.01 |
| 2006/0245577 A1* | 11/2006 | Mancuso et al. | ... | H04M 3/5183 379/265.02 |
| 2007/0121894 A1* | 5/2007 | Noble, Jr. et al. | .. | H04M 3/5158 379/265.02 |
| 2008/0221975 A1* | 9/2008 | Steul | ................. | G06Q 30/0277 705/7.31 |
| 2010/0172488 A1* | 7/2010 | Segall et al. | ........ | H04M 3/5158 379/266.07 |
| 2010/0189250 A1* | 7/2010 | Williams et al. | ... | H04M 3/5233 379/266.01 |
| 2011/0116618 A1* | 5/2011 | Zyarko et al. | ...... | H04M 3/5158 379/266.07 |
| 2013/0322615 A1* | 12/2013 | Oristian et al. | ..... | H04M 3/5232 379/266.06 |

(Continued)

*Primary Examiner* — Kharye Pope

(57) ABSTRACT

One example method of operation may include receiving an access request from a user device, creating a current queue position status of a user profile associated with the user device based on one or more known status identifiers associated with the user device, assigning the user profile to a sub-queue and a specified time slot of a queue, managed by a computing node, among various other user profiles stored in the queue, and initiating a communication session to the user device at a specific time.

15 Claims, 7 Drawing Sheets

(56) References Cited

U.S. PATENT DOCUMENTS

| | | | |
|---|---|---|---|
| 2014/0079207 A1* | 3/2014 | Zhakov et al. | H04M 3/5233 379/265.03 |
| 2014/0146960 A1* | 5/2014 | Williams | H04M 3/5238 379/265.09 |
| 2014/0153703 A1* | 6/2014 | Desai et al. | H04M 3/5166 379/88.01 |
| 2015/0085872 A1* | 3/2015 | Palawat et al. | H04L 45/30 370/422 |
| 2015/0086002 A1* | 3/2015 | Jain et al. | H04M 3/5235 379/265.1 |
| 2015/0322615 A1* | 11/2015 | Borlin et al. | D06F 37/245 68/140 |
| 2017/0024704 A1* | 1/2017 | Tompkins et al. | G06Q 10/1095 |
| 2017/0289355 A1* | 10/2017 | Mezhibovsky et al. | H04M 3/5238 |
| 2018/0054525 A1* | 2/2018 | Mezhibovsky et al. | H04M 3/5231 |
| 2018/0144829 A1* | 5/2018 | Cantor et al. | G16H 50/30 |
| 2019/0149662 A1* | 5/2019 | Mandic et al. | H04M 3/5231 379/266.07 |
| 2019/0172018 A1* | 6/2019 | Heffley | G06Q 30/04 |

\* cited by examiner

300

US 11,711,470 B1

DISTRIBUTED PARALLEL QUEUEING FOR CALL MANAGEMENT

TECHNICAL FIELD OF THE APPLICATION

This application relates to call management and more specifically to distributed parallel queueing for call management.

BACKGROUND OF THE APPLICATION

Conventionally, when a customer, such as a patient to a physician's office is waiting for a callback, test result, or other consultation with a physician, the customer usually calls the physician's office without success as the physicians are busy and tend to call the patients at irregular times. The likelihood of a missed call on both ends is high and causes more time inefficiencies for both parties.

Larger and more sophisticated facilities may have a customer management division that answers the phones or at least offers an automated call queue answering mechanism that places the callers in a queue in the order in which the calls were received. Being in a queue, in of itself, is no longer considered an advantageous approach to call management as the caller may have to wait on hold for long periods of time and lose productivity with other activities which the user could have been engaged with during such a waiting period.

Also, queues are centrally managed and are generally represented as a single line of individuals. This approach although simple to implement leaves behind the opportunity to manage large amounts of callers at the same time or in parallel.

SUMMARY OF THE APPLICATION

Example embodiments of the present application provide at least a method that includes at least one of receiving an access request from a user device, creating a current queue position status of a user profile associated with the user device based on one or more known status identifiers associated with the user device, assigning the user profile to a sub-queue and a specified time slot of a queue, managed by a computing node, among a plurality of other user profiles stored in the queue, and initiating a communication session to the user device at a specific time.

Another example embodiment may include a system that includes a user device, a computing node, and a service provider server configured to receive an access request from a user device, create a current queue position status of a user profile associated with the user device based on one or more known status identifiers associated with the user device, assign the user profile to a sub-queue and a specified time slot of a queue, managed by the computing node, among a plurality of other user profiles stored in the queue, and initiate a communication session to the user device at a specific time.

Another example embodiment may include a non-transitory computer readable storage medium configured to store instructions that when executed cause a processor to perform receiving an access request from a user device, creating a current queue position status of a user profile associated with the user device based on one or more known status identifiers associated with the user device, assigning the user profile to a sub-queue and a specified time slot of a queue, managed by a computing node, among a plurality of other user profiles stored in the queue, and initiating a communication session to the user device at a specific time.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide an application operating on a user device, such as a smartphone, cellular phone, tablet device, laptop or other computing device with a memory and a processor. The application may communicate with a network to communicate with a remote destination, such as a call processing center or service provider office. The application may communicate with a service center application or system application to manage incoming calls/messages/requests from customers. As the number of current calls/messages/requests increases in load, the application may dynamically allocate additional computing nodes as needed by allocating virtual machines or other stand-alone computing devices to manage the active call load.

Figure 1:
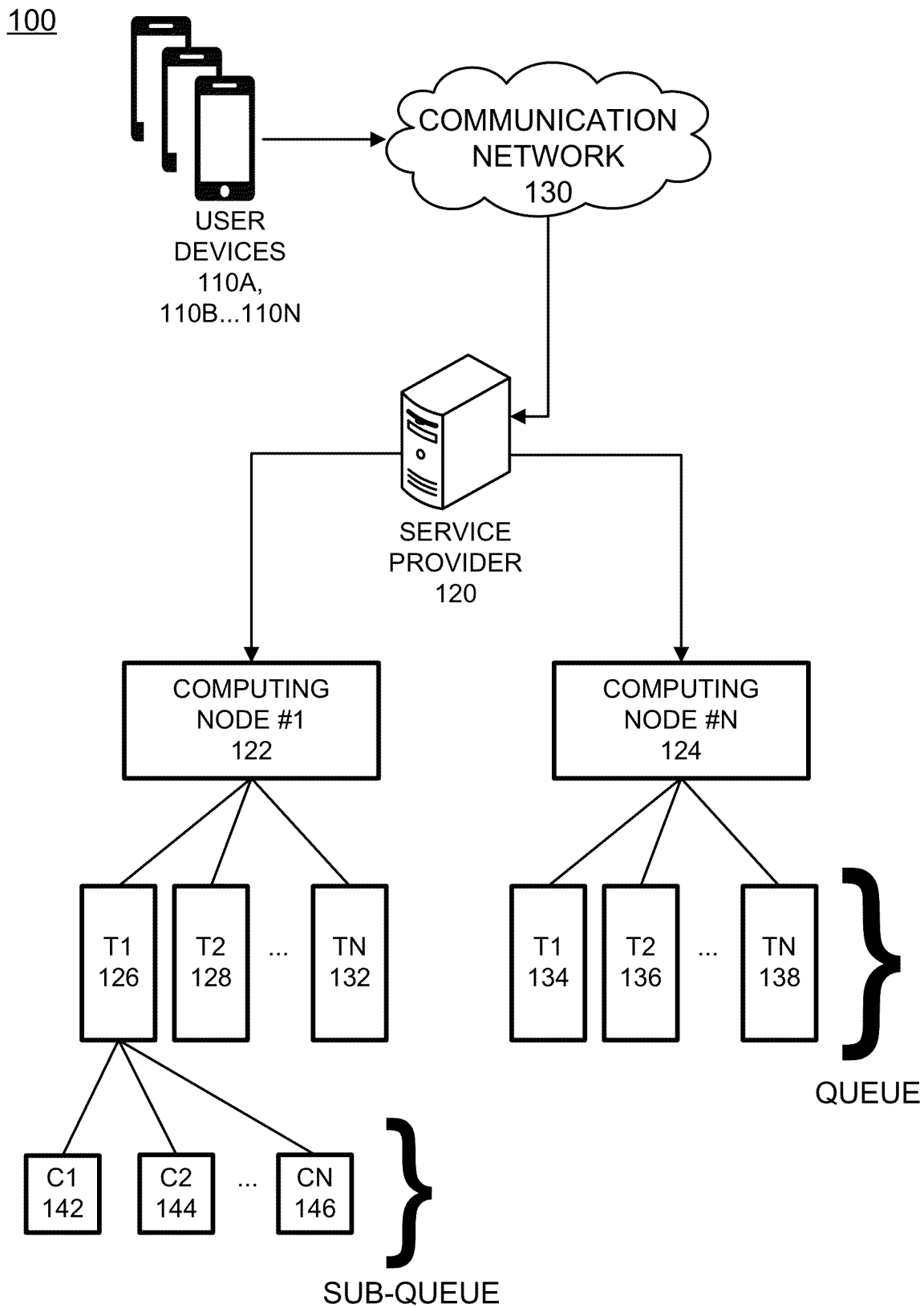
FIG. 1 illustrates an example communication network system example of managing calls/messages via a set of queues and sub-queues according to example embodiments.

FIG. 1 illustrates an example communication network system example of managing calls and a parallel call queue according to example embodiments. Referring to FIG. 1, the diagram 100 includes a set of user devices 110A, 110B...100N, which represent 'N' number of callers at any given time seeking access to the service provider. The communication network 130 may be a cellular network, data network, or other communication network that can receive calls and process calls/messages via a call management queue infrastructure. For example, any number of computing nodes 122/124 may be commissioned via the service provider server 120 at any given time to manage a growing or diminishing call demand (i.e., number of concurrent calls).

The computing nodes 122/124 may be virtual machines or stand-alone computing devices which are setup with a call queue management function that permits simultaneous calls to be received and queued in assigned intervals. In one example, a computing node 122 may have 'N' number of time slots (126-132) allocated and a predetermined number of calls may be assigned to a specific time slot interval. For example, one assignment may include a time slot interval 126 which is designated as having a capacity of 5 minutes of time as managed by the computing node 122. The intervals can then be dynamically managed to process calls in parallel up to the maximum allotment. For example, if the single calls assigned to user profiles 142, 144, 146, etc. (e.g., C1, C2...CN) are estimated to require about 30 seconds per call, then a five minute interval will yield up to 10 calls in a single 5-minute time slot. Then, the time slot T1 126 may be assigned up to 10 calls at a time, the eleventh call is moved to the next time slot T2 128 and continuing onward until another computing node is needed. Each time slot may have a same or similar number of call slots, however, only one set of sub-queues is provided in the diagram for simplicity. In this example, a computing node may have a fixed number of time slots, such as 126-132 for 122 and 134-138 for 124. The number of time slots may be dynamically adjusted and the number of calls per slot may be dynamically adjusted based on the call demand times, the computing power of the computers and other allocation preferences.

When accumulating (queuing-up) the calls received, the calls/user profiles may be identified and buffered until resources are available to service the calls. This queue configuration can be used for callback purposes to call user devices back at later times as the resources are made available. However, callback functionality is just one option as the dynamic queue and sub-queues managed by more than one computing node permits parallel call management for processing calls in real-time and without lengthy delays. Overall, queue wait times should decrease whether in a live queue call scenario or a callback queue scenario.

In operation, the application on the customer side may be a smartphone application that permits calls/messages to be sent, such as requests for service. The users of the customer/user devices may receive a prompt via the application to select call time windows or callback slots/windows when they can expect to receive a callback. The system application on the service provider server 120 may store the available times in slots, for example, such as 15 minute intervals. The customer identifier/profile may be placed within those timeslots which match the selections of the user.

Prioritization may also take place based on the customer needs, status, etc. The system application loads the customers in the queue according to a particular call slot sub-queue (i.e., 142-146). The next customer in the current time slot may be recalled at the proper times and then called back accordingly. Since the various computing nodes 122/124 each have available slots at any particular time, the customers with priority indicators (e.g., urgent needs, larger time since last response, etc.), can be processed in parallel among the time slots of one or more of the computing nodes. A time slot permits one or more computing nodes to process a set of callers in those time slots accordingly. At any time, only one timeslot is being processed. Timeslots are unique. Each computing node can request a caller to process from a particular time slot. After receiving a unique caller profile, the computing node can start processing that particular caller via an assigned sub-queue, which represents a particular time slot (t1, t2...tn), a particular time slot interval (i1, i2...iN) and a particular computing node. Because the callers are unique across different nodes, they can be processed in parallel without impacting each other since a time slot and time slot interval can be the same across more than one computing node, thus offering a common time slot for more than one node and thus parallel processing of more than one call in a common time slot at a particular time.

The main queue may be organized to accommodate certain callers. The callers within the queue may be assigned to sub-queues which are also processed in parallel up to a certain amount of calls per computing node. When a maximum number of calls is reached in a particular queue and/or sub-queue, the system application can decide if it is necessary to create a new set of sub-queues and increase the overall queue size across multiple nodes. The system application may automatically create or commission a new virtual machine as a computing node with a particular call management infrastructure. The computing devices may be modules that are setup in a DOCKER CONTAINER. Each computing node may be its own CONTAINER used to emulate a virtual machine which is an allocation of resources from a physical device. The 'queue' may correspond to a shared timeslot. In a conventional queuing system, there is only one queue and every user is aggregated together in the single queue. In example embodiments, since the 'queue' itself is an omnibus concept and the assignment is to one of the sub-queues for each user, then assignment of users to the sub-queues provides the ability to share a same time slot identified from another sub-queue or at another computing node since each computing node offers more sub-queues as part of an overall main queue.

Figure 2A:
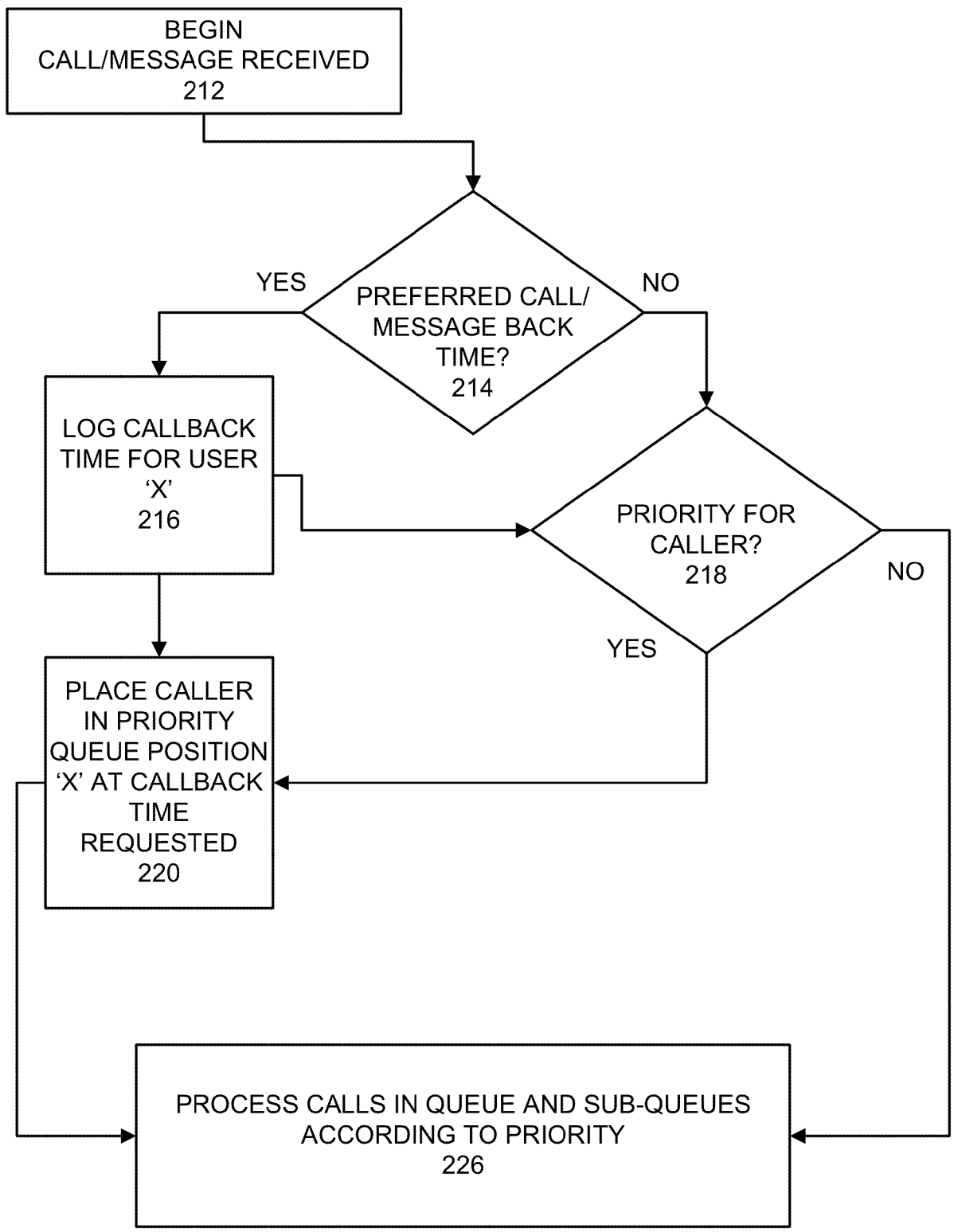
FIG. 2A illustrates a flow diagram procedure for receiving and assigning calls/messages to a call/message queue according to example embodiments.

FIG. 2A illustrates a flow diagram procedure 200 for receiving and assigning calls/messages to a call/message queue according to example embodiments. Referring to FIG. 2A, the logic diagram 200 begins with a call/message being identified at the service provider system application from a user device. The call/message may be answered 212 by an automated answering service of the server and a set of prompts may be sent to the user device to identify a preferred callback time 214. Any example that is referring to a call may also be a message sent from the user device, such as a short message service message (SMS). If a callback time is provided, the callback time may be logged 216 for the user, and the caller may be placed in a priority queue position corresponding to a callback time that is requested

220. If no callback time is specified, the caller's profile may be examined to identify whether the caller has an assigned priority 218 or not. If not, the caller identifier is placed in a queue at a next available time slot, which is processed, in turn, by the call management system 226. Any priority or higher priority-placed caller identifiers associated with the callers are identified first during a callback timeslot associated with the queue assignment. Also, the higher priority callers are awarded first priority when assigning the callers to the call queues and sub-queues.

Figure 2B:
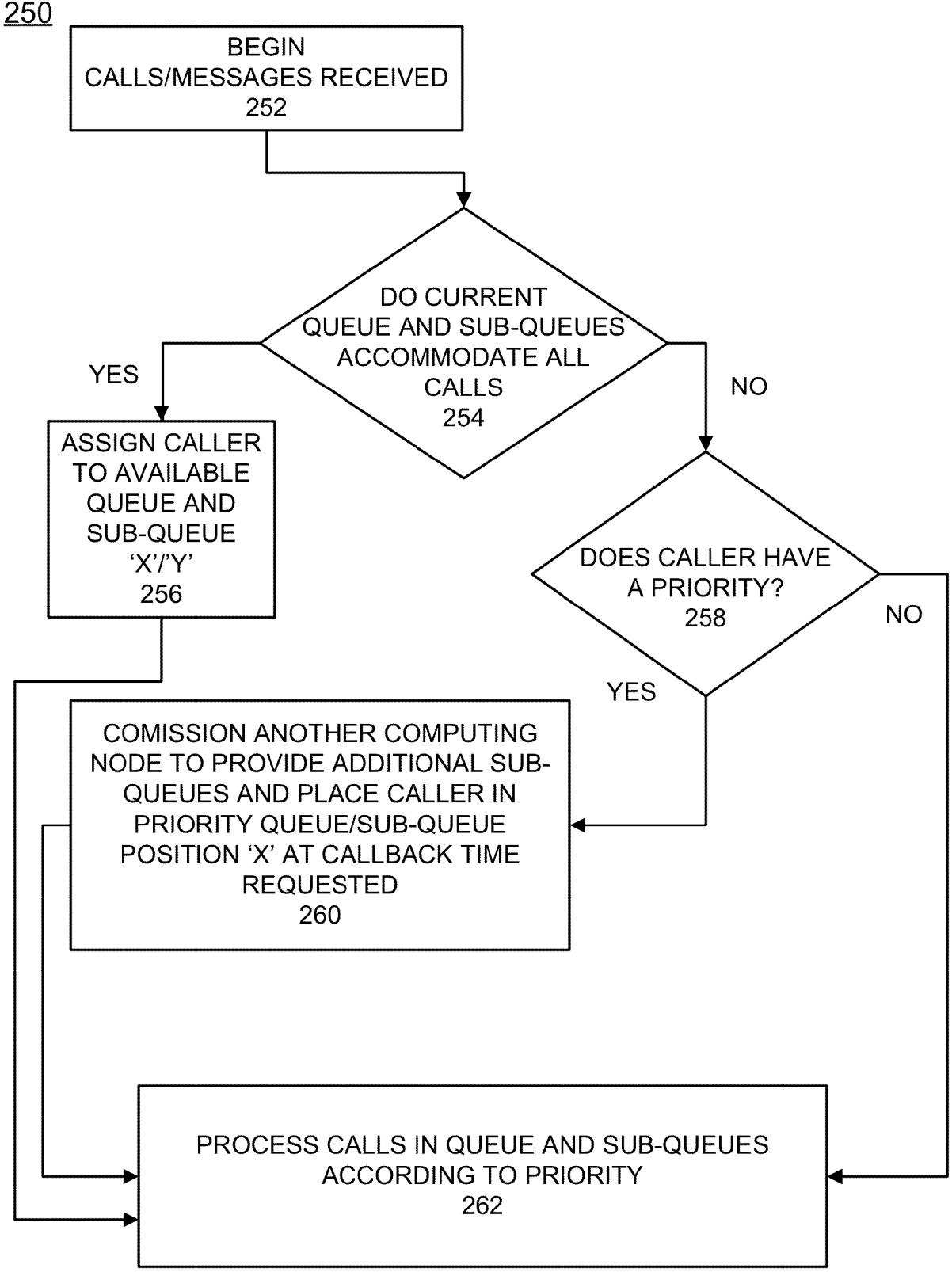
FIG. 2B illustrates a flow diagram procedure for receiving and assigning calls/messages to a call/message queue and expanding a needed number of call/message management queues/sub-queues according to example embodiments.

FIG. 2B illustrates a flow diagram procedure for receiving and assigning calls/messages to a call/message queue and expanding a needed number of call/message management queues/sub-queues according to example embodiments. Referring to FIG. 2B, in this example 250, the calls/messages are received 252 from various user devices seeking access to customer services. The determination is made as to whether there are enough time slots and corresponding queues to accommodate the all current calls 254 via the current computing node. If there are queues/sub-queues available, then the caller may be assigned accordingly 256. If not, then the caller is identified by caller identifier/profile, to determine whether the profile is linked to a priority status 258, if not the call is processed in turn after the priority assigned callers 262. If so, the caller(s) may require an additional computing node be commissioned 260 to provide additional queues and sub-queues for that caller due to their pre-existing priority status.

Figure 3:
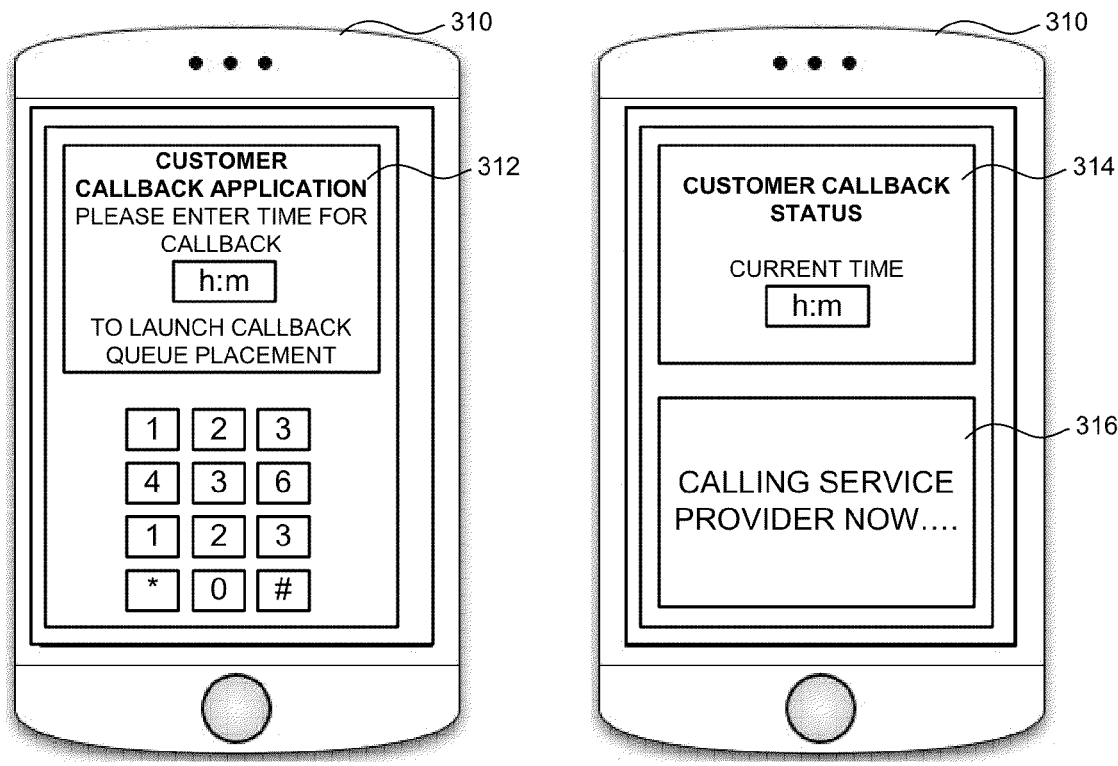
FIG. 3 illustrates a user interface configured to provide access to a callback service according to example embodiments.

FIG. 3 illustrates a user interface configured to provide access to a callback service according to example embodiments. Referring to FIG. 3, the sample user interfaces 300 are those which may be viewable to a caller/customer of the service provider. The caller's device 310 may be a calling device that can call and message the service center system application and attempt to connect for services, such as live agents, products, purchases, etc. The customer may be prompted to provide a time when they would prefer a callback 312. The customer can then enter such a time and the caller identifier may be referenced and included in a queue to accommodate such a time. Once the callback time is processed, the customer device may show a callback time status window 314 and a calling prompt 316 which matures when the call is sent at the appropriate time.

Figure 4:
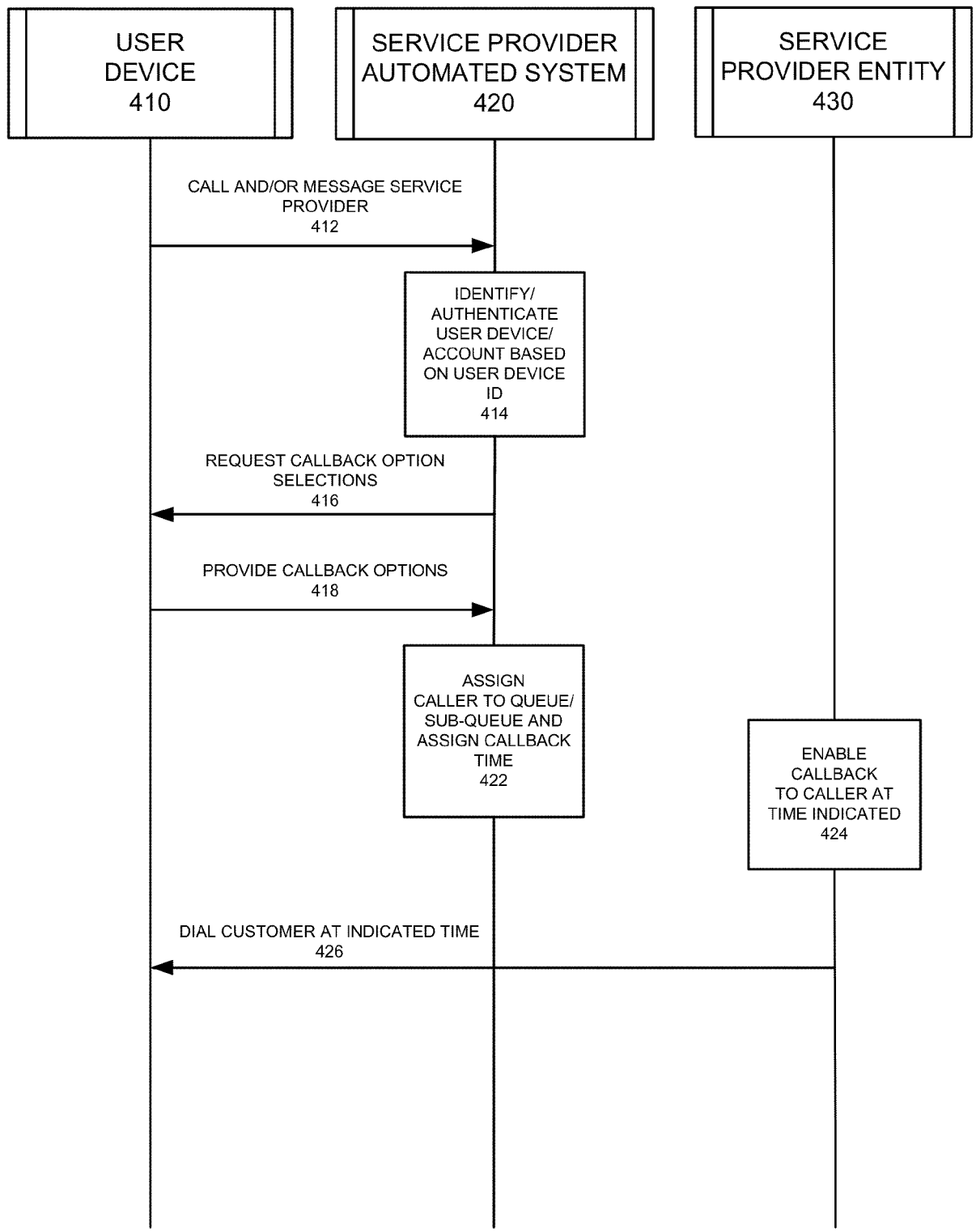
FIG. 4 illustrates a system signaling diagram for conducting call queue management according to example embodiments.

FIG. 4 illustrates a system signaling diagram for conducting call queue management according to example embodiments. Referring to FIG. 4, the system 400 provides a user device 410, a service provider automated system 420 (i.e., computing nodes) and a service provider entity 430. In this example, the method 400 may provide receiving an access request from a user device, such a call or message 412. The service provider application 420 may identify and authenticate the user device and retrieve a user profile. The callback options may be sent to the user device 416 and selected and sent back 418 to the application. The service provider application 420 may then create a current queue position status 422 of a user profile associated with the user device based on one or more known status identifiers associated with the user device, such as priorities and other criteria for placing the user profile in a specific queue and sub-queue position. The method may also include assigning the user profile to a sub-queue and a specified time slot of a queue, managed by a computing node, among a plurality of other user profiles stored in the queue. The callback to the caller may be enabled at a particular time. The method may also provide initiating a communication session to the user device at a specific time 426.

The method may also provide assigning the user profile to the sub-queue based on a priority assigned to the user profile. The specified time slot assigned to the user profile may also be assigned to at least one other user profile, and when the specified time slot assigned to the user profile is also assigned to at least one other user profile, the method may provide initiating another computing node, and assigning the user profile to the specified time slot and the sub-queue managed by the another computing node. The method may also include processing the communication session via the another computing node and the another communication session via the computing node, in parallel, during the specified time slot, initiating another computing node when a total number of available sub-queues managed by the computing node are occupied and/or initiating another computing node when a priority of the user profile is elevated and a needed time slot managed by the computing node is occupied.

Figure 5:
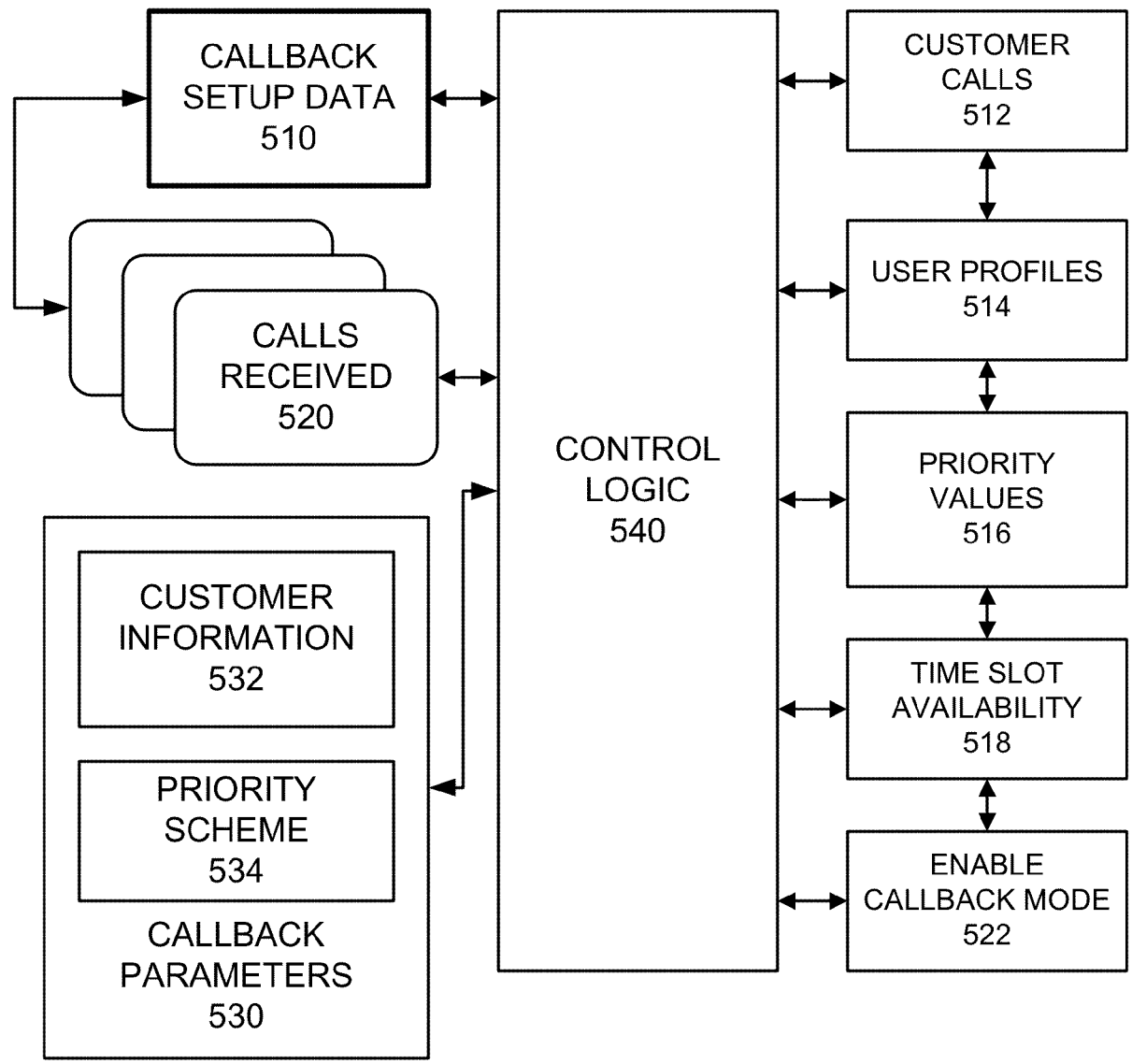
FIG. 5 illustrates a logic diagram with the input and output data managed by a controller to provide call queue management according to example embodiments.

FIG. 5 illustrates a logic diagram with the input and output data managed by a controller to provide call queue management according to example embodiments. Referring to FIG. 5, the logic configuration 500 provides various input parameters, such as callback setup data 510, calls received 520 and other callback parameters 530, such as customer information 532 and a priority scheme 534. The processor/controller 540 may process the input data and produce various output data, such as customer calls 512, user profile references and assignment 514, priority values 516 assigned to the user profiles, time slot availability 518 based on the available time slots and callbacks 522 to the user devices of the actively queued user profiles.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example network element 600, which may represent any of the above-described network components of the other figures.

Figure 6:
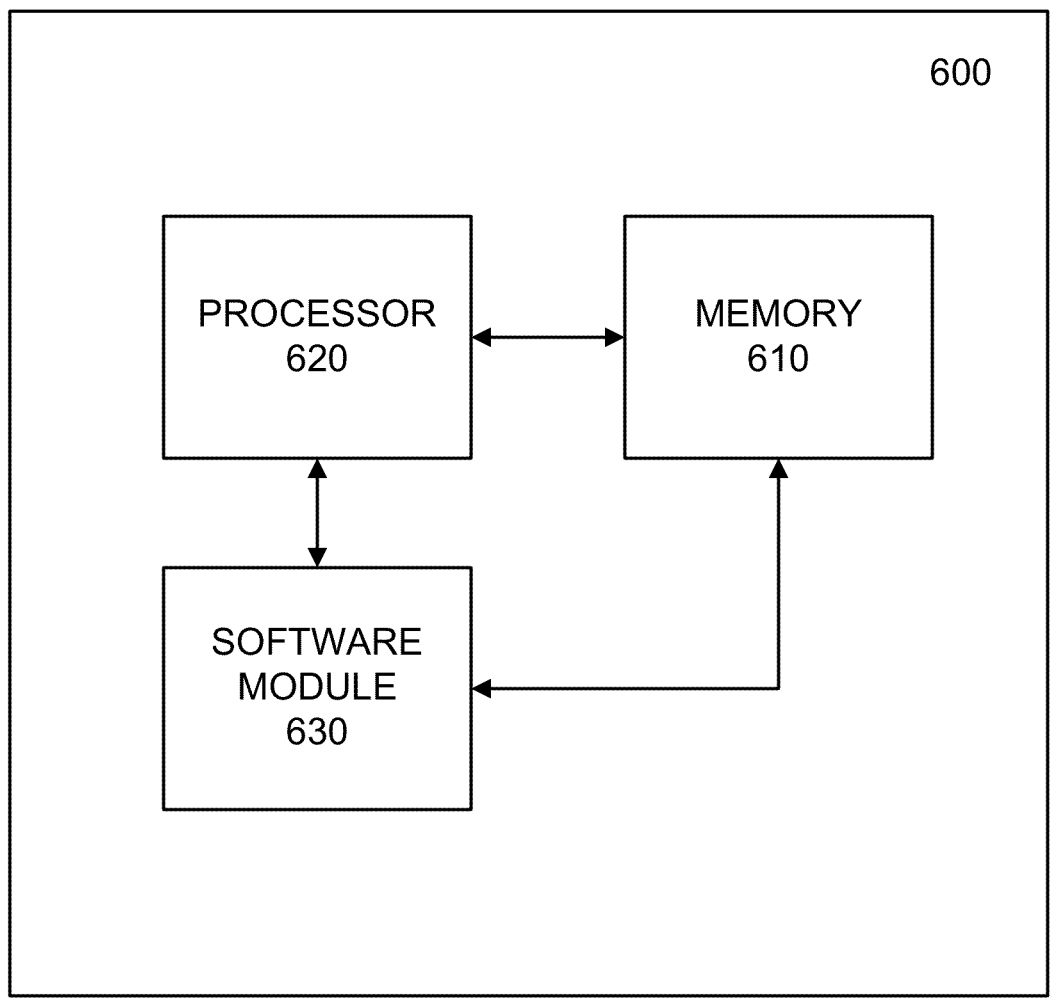
FIG. 6 illustrates an example network entity device configured to store instructions, software, and corresponding hardware for executing the same, according to example embodiments of the present application.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. The computer readable medium may be a non-transitory computer readable medium that includes tangible hardware components in addition to software stored in memory. Furthermore, a software module 630 may be another discrete entity that is part of the network entity 600, and which contains software instructions that may be executed by the processor

620. In addition to the above noted components of the network entity 600, the network entity 600 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   receiving, by a service provider, an access request from a first user device;
   creating, by the service provider, a current queue position status based on one or more known status identifiers associated with the first user device;
   selecting, by the service provider, and based on the current queue position status, a first computer node of a plurality of computer nodes, the first computer node managing a first queue including a first plurality of time slots, each time slot of the first plurality of times slots including a first plurality of sub-queues;
   identifying, by the service provider, that the first plurality of time slots are unavailable;
   in response to the identification, creating, by the service provider, a second queue, including a second plurality of time slots, in a second computer node of the plurality of computer nodes, where each time slot of the second plurality of time slots includes a second plurality of sub-queues;
   assigning, by the service provider, information associated with a profile of a user of the first user device to a first sub-queue, of the second plurality of sub-queues, assigned to a first time slot of the second plurality of time slots;
   assigning, by the service provider, information associated with a profile of a user of a second user device to a second sub-queue, of the second plurality of sub-queues, assigned to the first time slot of the second plurality of time slots; and initiating, by the service provider, parallel communication sessions to the first user device and the second user device during the first time slot.

2. The method of claim 1, wherein the assigning the information associated with a profile of a user of the first user device to the first sub-queue further comprises:

assigning the information associated with the profile of the user of the first user device to the first sub-queue based on a priority assigned to the profile of the user of the first user device, the assigned priority corresponding to the one or more status identifiers.

3. The method of claim 1, further comprising:

identifying that a profile of a user of a third user device assigned to the first time slot exceeds a number of allotted sub-queues available for the first time slot; and assigning information associated with the profile of the user of the third user device to a third sub-queue in the first time slot managed by the second computer node of the plurality of computer nodes.

4. The method of claim 1, wherein the second sub-queue is assigned to the first time slot, or is assigned to a second time slot of the plurality of time slots.

5. The method of claim 1, wherein:

the assigning the information associated with the profile of the user of the first user device is performed when a response to the access request is unavailable, and the communication session to the first user device includes a callback in response to the access request.

6. A service provider, comprising:

a memory storing on or more instructions; and a processor that executes the one or more instructions to configure the processor to:

receive an access request from a first user device, create a current queue position status based on one or more known status identifiers associated with the first user device, select, based on the current queue position status, a first computer node of a plurality of computer nodes, the first computer node managing a first queue including a first plurality of time slots, each time slot of the first plurality of times slots including a first plurality of sub-queues, identify that the first plurality of time slots are unavailable, in response to the identifying, creating a second queue, including a second plurality of time slots, in a second computer node of the plurality of computer nodes, where each time slot of the second plurality of time slots includes a second plurality of sub-queues, assign information associated with a profile of a user of the first user device to a first sub-queue, of the second plurality of sub-queues, assigned to a first time slot of the second plurality of time slots, assign information associated with a profile of a user of a second user device to a second sub-queue, of the second plurality of sub-queues, assigned to the first time slot of the second plurality of time slots, and initiate parallel communication sessions to the first user device and the second user device during the first time slot.

7. The system of claim 6, wherein, when the processor is configured to:

assign the information associated with a profile of a user of the first user device to the first sub-queue, the processor is further configured to:

assign the information associated with the profile of the user of the first user device to the first sub-queue based on a priority assigned to the profile of the user of the first user device, the assigned priority corresponding to the one or more status identifiers.

8. The system of claim 6, wherein the processor is configured to:

identify that a profile of a user of a third user device assigned to the first time slot exceeds a number of allotted sub-queues available for the first time slot; and assign information associated with the profile of the user of the third user device to a third sub-queue in the first time slot managed by the second computer node of the plurality of computer nodes.

9. The system of claim 6, wherein the second sub-queue is assigned to the first time slot, or is assigned to a second time slot of the plurality of time slots.

10. The system of claim 6, wherein the processor is further configured to:

assign the information associated with the profile of the user of the first user device when a response to the access request is unavailable, and the communication session to the first user device includes a callback in response to the access request.

11. A non-transitory computer readable storage medium storing one or more instructions that when executed by a processor cause the processor to perform:

receiving an access request from a first user device;

creating a current queue position status based on one or more known status identifiers associated with the first user device;

selecting and based on the current queue position status, a first computer node of a plurality of computer nodes, the first computer node managing a first queue including a first plurality of time slots, each time slot of the first plurality of times slots including a first plurality of sub-queues;

identifying that the first plurality of time slots are unavailable;

in response to the identification a second queue, including a second plurality of time slots, in a second computer node of the plurality of computer nodes, where each time slot of the second plurality of time slots includes a second plurality of sub-queues;

assigning information associated with a profile of a user of the first user device to a first sub-queue, of the second plurality of sub-queues, assigned to a first time slot of the second plurality of time slots;

assigning information associated with a profile of a user of a second user device to a second sub-queue, of the second plurality of sub-queues, assigned to the first time slot of the second plurality of time slots; and initiating parallel communication sessions to the first user device and the second user device during the first time slot.

12. The non-transitory computer readable storage medium of claim 11, wherein, when the processor is configured to perform assigning the information associated with a profile of a user of the first user device to the first sub-queue, the processor is further configured to perform:

assigning the information associated with the profile of the user of the first user device to the first sub-que based on a priority assigned to the profile of the user of the first user device, the assigned priority corresponding to the one or more status identifiers.

13. The non-transitory computer readable storage medium of claim 11, wherein the one or more instructions further cause the processor to perform:
- identifying that a profile of a user of a third user device assigned to the first time slot exceeds a number of allotted sub-queues available for the first time slot the time slot; and
- assigning information associated with the profile of the user of the third user device to a third sub-queue in the first time slot managed by the second computer node of the plurality of computer nodes.

14. The non-transitory computer readable storage medium of claim 11, wherein the second sub-queue is assigned to the first time slot, or is assigned to a second time slot of the plurality of time slots.

15. The non-transitory computer readable storage medium of claim 11, wherein:
- the assigning the information associated with the profile of the user of the first user device is performed when a response to the access request is unavailable, and
- the communication session to the first user device includes a callback in response to the access request.

* * * * *